United States Patent [19]

Dufour

[11] Patent Number: 4,859,829

[45] Date of Patent: Aug. 22, 1989

[54] ADAPTIVE WELDING CONTROL VISION HEAD

[75] Inventor: L. Marc Dufour, Montreal, Canada

[73] Assignee: Canadian Patents & Development Ltd., Ottawa, Canada

[21] Appl. No.: 144,109

[22] Filed: Jan. 15, 1988

[30] Foreign Application Priority Data

Sep. 22, 1987 [CA] Canada .................................. 546745

[51] Int. Cl.$^4$ .............................................. B23K 9/00
[52] U.S. Cl. ............................ 219/124.34; 219/130.01
[58] Field of Search ........................ 219/124.34, 130.01

[56] References Cited

U.S. PATENT DOCUMENTS

| | | | |
|---|---|---|---|
| 4,491,719 | 1/1985 | Corbj, Jr. ...................... | 219/124.34 |
| 4,555,613 | 11/1985 | Shulman ......................... | 219/124.34 |
| 4,599,506 | 7/1986 | Burke et al. .................... | 219/124.34 |
| 4,609,804 | 9/1986 | Kishi et al. ........................ | 219/136 |

Primary Examiner—Clifford C. Shaw
Attorney, Agent, or Firm—Yoshiharu Toyooka

[57] ABSTRACT

An adaptive welding control vision head with a metal enclosure for attachment to a welding head. The side of the enclosure facing the workpiece is angled away from the welding head, has two apertures and its external surface is coated with oil. Mounted inside the enclosure is a means of projecting a structural light pattern onto a workpiece and a means of monitoring the resulting scattered light. The inside of the enclosure is maintained at a positive air pressure to prevent welding fumes from entering and is cooled to prevent heat accumulation.

16 Claims, 3 Drawing Sheets

ADAPTIVE WELDING CONTROL VISION HEAD

BACKGROUND OF THE INVENTION

Robot vision systems are becoming very important in the application of adaptive control of automated welding systems. A serious problem which these systems must overcome is the harshness of the welding environment. Optical equipment used in adaptive control of the welding process is at a high risk of being damaged or rendered useless because of the spatter of particles of molten metal which are projected outward for the welding arc, fumes from the welding process that can leave a sooty residue on optical lenses and heat from the arc that can distort optical equipment.

Methods of protecting optical equipment in environments of high temperature and flying particles are mentioned in U.S. Pat. Nos. 3,321,265 issued May 23, 1967 to Serge and Marcel Clave, and 3,310,356 issued Mar. 21, 1967 to Willy Borberg. These patents are examples of specific enclosures used to protect optical equipment. Another example is found in U.S. Pat. No. 4,450,339 issued May 22, 1984 to Nelson R. Corby, Jr. These patents do not provide for the projection of a light which is required of an active vision system. U.S. Pat. No. 4,497,996 issued Feb. 5, 1985 to Charles J. Libby, Jr. provides for the projection of light but is constructed in such a way that it would require frequent cleaning.

OBJECT OF THE INVENTION

It is the object of the present invention to provide a device which will allow optical equipment, in the form of a light source and a light monitor, to be attached to the welding head and be such as to require infrequent cleaning.

A further object of the present invention is to provide a device to protect the optical equipment from the flying particles, fumes and heat of the welding process.

SUMMARY OF INVENTION

The object is achieved in accordance with the present invention by providing for a vision head to supply the signals required for visual control of an adaptive welding control system. Said vision head comprises a metal enclosure for attachment to a welding head. The welding head produces a welding pool of molten metal on the workpiece. Said enclosure has a side facing a workpiece, the said side forming an angle with a plane tangent to the workpiece and passing through said weld pool, said side having a first and second aperture. The first and the second apertures are located in a same radial direction from the axis normal to the workpiece at the weld pool. The side is slanted with respect to the plane so that the first aperture is nearer to the axis and to the plane than the second aperture. The range of angles found to give the preferred results was from 5° to 45°. Mounted in the metal enclosure is a projecting means for projecting a structured light pattern onto the workpiece through one of the two apertures. Also mounted in the enclosure is a monitoring means for monitoring, through the other aperture, the structural light after it has been scattered by the workpiece and converting the scattered light images into electrical signals required for visual control of an adaptive welding control system. The vision head, in one embodiment, also includes a pressurizing means for maintaining a positive air pressure in the enclosure and a cooling means for maintaining the temperature of the enclosure.

In another embodiment of the present invention, the external surface of the side facing the enclosure is covered with an oil coating to prevent particles of molten metal thrown from the welding torch from adhering to the surface.

DESCRIPTION OF THE PREFERRED EMBODIMENT

Figure 1:
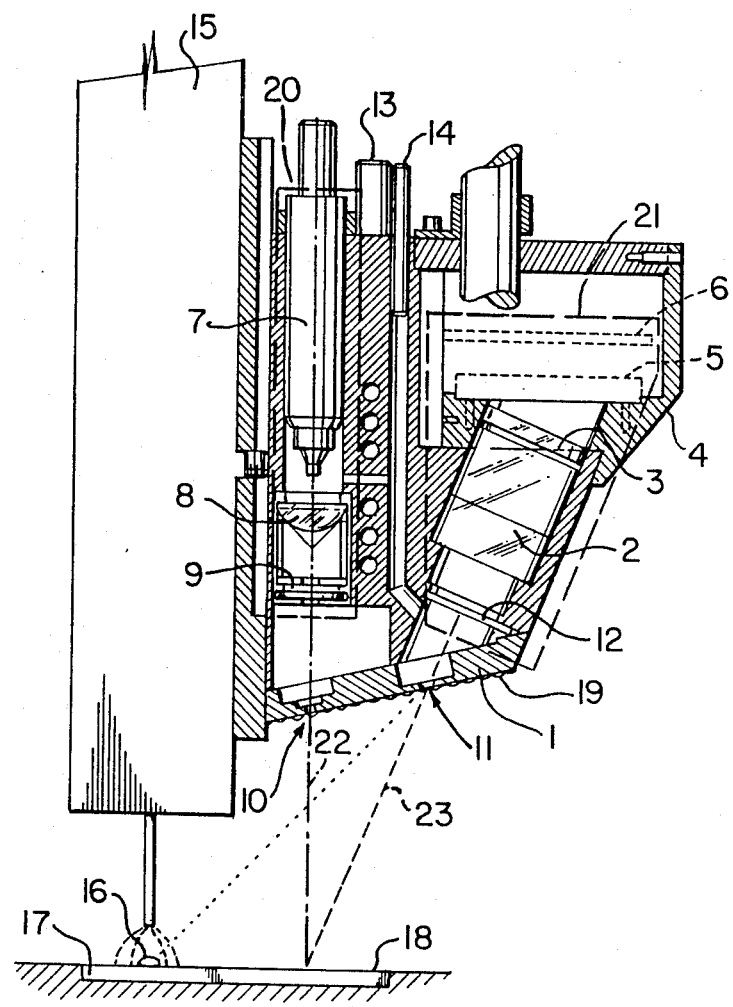
FIG. 1 shows a cross-section of the vision head.

FIG. 1 shows a cross-section of the vision head. The side 1 of the enclosure 4 facing the workpiece 17 is slanted away from the welding head 15 so as to form an angle of 14° with the plane 18 tangent to the workpiece 17 passing through the weld pool 16. In said side 1, there is a first aperture 10 and a second aperture 11. These apertures 10 and 11 are oriented perpendicular to the said side 1. The external surface of the said side 1 is covered with an oil coating 19 which is the same as the antisplatter coating commonly used in the projection of welding heads.

A projecting means 20 is mounted in the enclosure 4 so that a light pattern 22 of well defined geometry, in this case a line, can be projected onto the workpiece. The projecting means 20 comprises a light source 7 which projects through a cylindrical lens 8 and a protective plate 9 to protect the lens from foreign particles, and finally through the first aperture 10 which is 0.5 mm by 15 mm and onto the workpiece 17. The light source 7 can be selected from the group consisting of a fiber optic bundle and a laser diode. The range of dimensions for the first aperture 10 is up to 30 mm in length and from 0.5 mm to 2.0 mm in width.

Also mounted in the enclosure is a monitoring means 21 for monitoring the scattered light 23 of the structured light pattern 22 after it has struck the workpiece 17. Upon leaving the workpiece 17 the scattered light 23 passes through the second aperture 11 which has a diameter of 1.5 mm and passes through a protective plate 12 which prevents any particles thrown from the welding torch 15 from striking the lens 2. The range of dimensions for the second aperture 11 is from 0.5 mm to 2.0 mm in diameter. The scattered light 23 then passes through a precision lens 2 and then through an interference filter 3 which prevents light other than the scattered light of the projected light source from passing to the detector 5 which is a two dimensional array charge coupled device mounted in the enclosure to convert the scattered light images 23 into electrical signals. A printed circuit 6 transmits the electrical signals to the adaptive welding control system.

Figure 3:
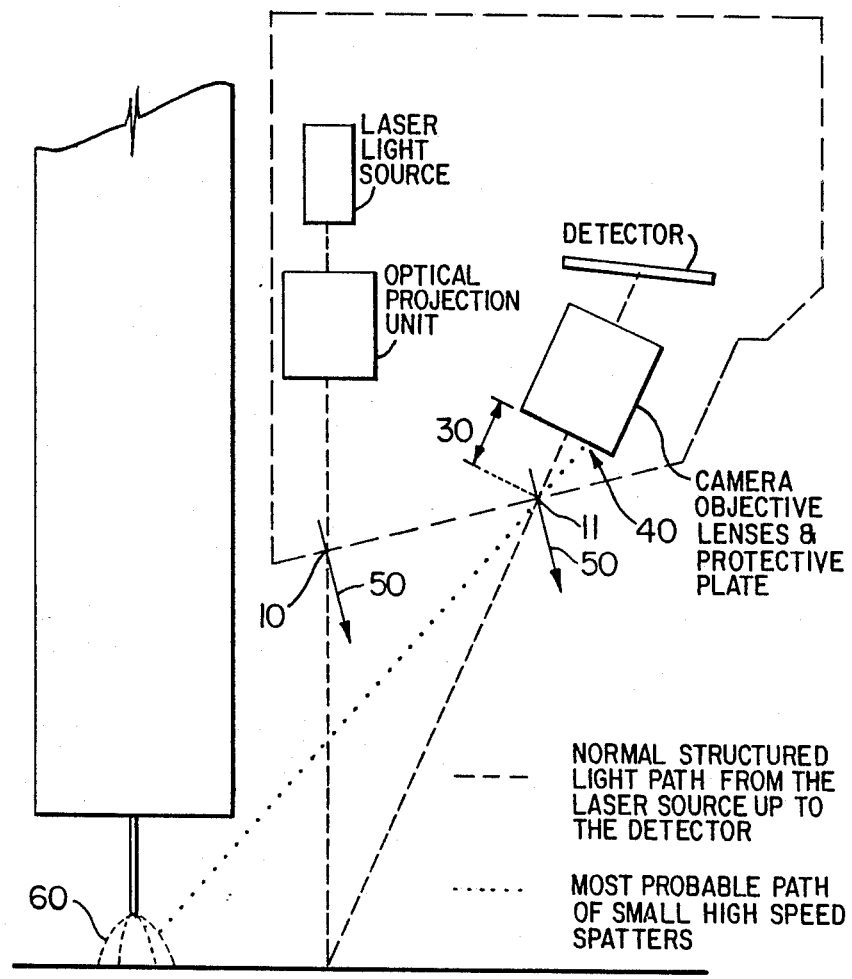
FIG. 3 shows the advantage of the particular geometry of the vision head.

The arrangement of the second aperture 11, lens 2 and filter 3 are such that they form a telecentric configuration. This configuration ensures complete collimation of the light before it reaches the filter 3. This prevents vignetting and permits the use of a 2.5 nanometer as opposed to the usual 10 nanometer filter. As seen in FIG. 3, the minimum distance 30 between the second aperture 11 and the lens 2 should be small enough to give a sufficiently wide field of vision and great enough to allow for the dispersion of flying metal particles that may find their way through the second aperture. This distance has been found to be from 10 to 40 mm with 20 mm giving the preferred results. This will ensure that the most probable point of impact 40 of any small metal particle will occur on that part of the lens 2 that is least used.

A connection 13 for air provides a pressurizing means by allowing air to flow into the enclosure 4 at an approximate rate of 3 liters per minute and results in a small positive air pressure within the enclosure 4 which prevents fumes from entering the enclosure 4 through the apertures 10 and 11. As seen in FIG. 3, the direction 50 of the air flow resulting from the small internal positive air pressure is away from the welding arc and its surrounding weld pool inert gas shield 60. The air pressure is used to protect the optical equipment from fumes and not to stop spatters.

A connection 14 for cooling provides a cooling means. The flow of coolant, usually water, prevents heat accumulation in the enclosure.

Figure 2B:
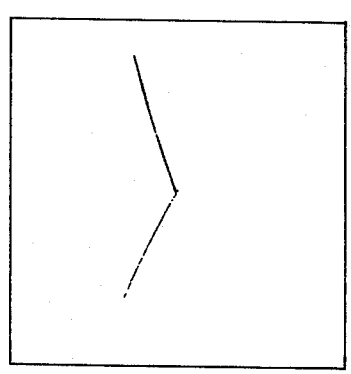
FIGS. 2A, 2B and 2C show exemplary images obtained from terminals A, B and C shown in FIG. 2.
Figure 2A:
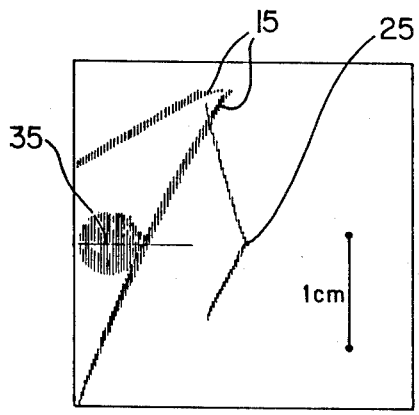
Figure 2:
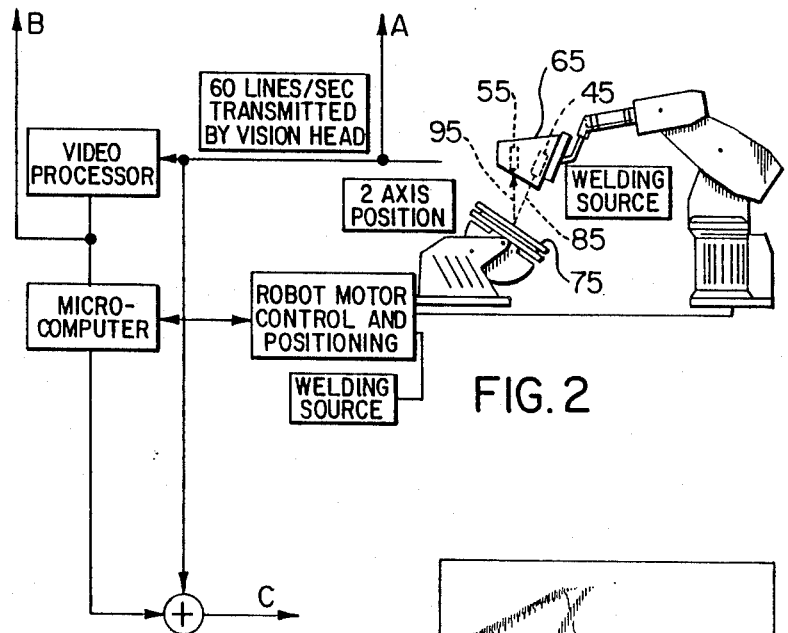
FIG. 2 is a block diagram of the adaptive welding control system.

FIG. 2 is a block diagram of the adaptive control system. The light source 45 mounted in the enclosure 65 projects a structured light pattern 85 onto the workpiece 75. The scattered light 95 is sensed by the monitoring means 55 which produces at terminal A a typical image as seen in FIG. 2A. At the centre of the figure is the characteristic angle joint profile 25. The image contains a large blur at 35 at the left caused by the light from the welding arc and by the trace 15 of two particles of molten metal which have crossed the field of vision.

The image is sent to the video processor for analysis.

FIG. 2B shows the digitized profile generated in real time by the video processor at terminals B of FIG. 2 from the video signal supplied by the monitoring means 55. The processor transmits its results to the micro-computer which performs the calculations required to provide the welding parameters: position and orientation of the joint, distance between edges, etc.

Figure 2C:
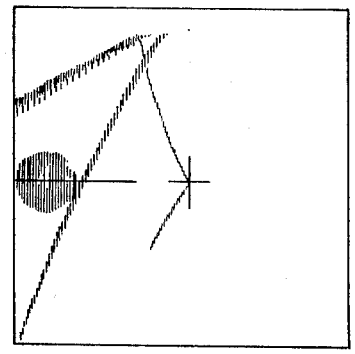

FIG. 2C is a typical image at terminal C of FIG. 2 and shows a cross indicating the calculated centre of the weld joint.

I claim:

1. A vision head to supply the electrical signals required for visual control of an adaptive welding control system with a welding head, which produces a weld pool on a workpiece being welded, comprising:
    (a) a metal enclosure for attachment to the welding head having a side facing the workpiece, the said side forming an angle with a plane tangent to the workpiece and passing through the weld pool, said side having a first and a second aperture, both apertures located in a same radial direction from the axis normal to the said workpiece at the said weld pool, the said side being slanted with respect to the said plane so that the said first aperture is nearer to the said axis and to the said plane than the said second aperture,
    (b) projecting means mounted in said enclosure for projecting a structured light pattern onto the workpiece through one of the said two apertures,
    (c) monitoring means mounted in said enclosure for monitoring scattered light of the said structured light pattern on the workpiece through the other of the said two apertures, and converting said scattered light into electrical signals required for visual control, and
    (d) cooling means for maintaining the temperature of the enclosure.

2. A vision head according to claim 1, wherein the said first and second apertures are oriented perpendicularly to said side.

3. A vision head according to claim 2, wherein the side facing the workpiece has an oil coating on the external surface of the side.

4. A vision head as in claim 3, wherein said projecting means comprises:
    (a) a light source mounted within the enclosure,
    (b) a lens mounted in the enclosure in such a way as to focus the light from said light source onto the workpiece as the said structured light pattern through the first aperture, and
    (c) a protector plate mounted in the enclosure between the lens and the first aperture to protect the lens from foreign particles.

5. A vision head according to claim 4 wherein the light source is selected from a group consisting of an optic fibre bundle, and a laser diode.

6. The vision head according to claim 4 further comprising pressurizing means for maintaining a positive air pressure in the said enclosure.

7. A vision head as in claim 3, wherein said monitoring means comprises:
    (a) circuit means for transmitting electrical signals to the adaptive welding control system,
    (b) converting means mounted in the enclosure for converting the scattered light of the structured light pattern into electrical signals,
    (c) a lens mounted in the enclosure to focus the scattered light onto said converting means,
    (d) an interference filter mounted in the enclosure between the converting means and the lens to prevent any light other than the scattered light from the structured light pattern from striking said converting means,
    (e) a protector plate mounted in the enclosure between the lens and the second aperture to protect the lens from foreign particles.

8. A vision head according to claim 7 wherein the converting means is a two-dimensional array charge coupled device.

9. The vision head according to claim 7 further comprising pressurizing means for maintaining a positive air pressure in the said enclosure.

10. A vision head according to claim 3, wherein the first aperture is a slit up to 30 mm long and from 0.5 to 2 mm wide.

11. A vision head according to claim 10, wherein the first aperture is a slit 15 mm long and 0.5 mm wide.

12. A vision head according to claim 3, wherein the second aperture is a hole from 0.5 to 2 mm in diameter.

13. A vision head according to claim 12, wherein the second aperture is a hole 1.5 mm in diameter.

14. A vision head according to claim 3, wherein the said oil coating is an anti-spatter coating.

15. A vision head as in claim 3 wherein the side facing the workpiece forms an angle of 5° to 45° with a plane tangent to the workpiece and passing through the weld pool.

16. The vision head according to claim 3 further comprising pressurizing means for maintaining a positive air pressure in the said enclosure.

* * * * *